Nov. 25, 1947.  H. C. RONFELDT  2,431,509
MOWER GUARD
Filed July 22, 1944  3 Sheets-Sheet 1
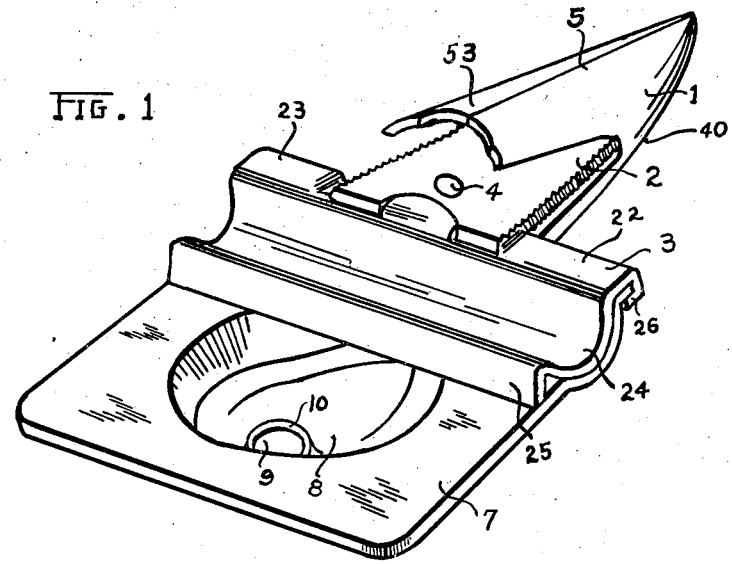
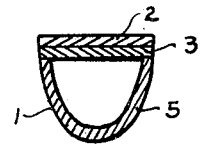
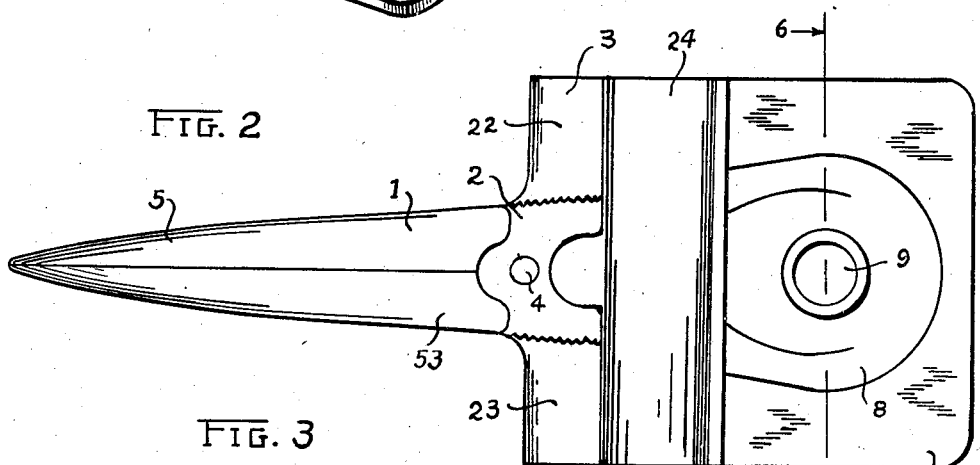
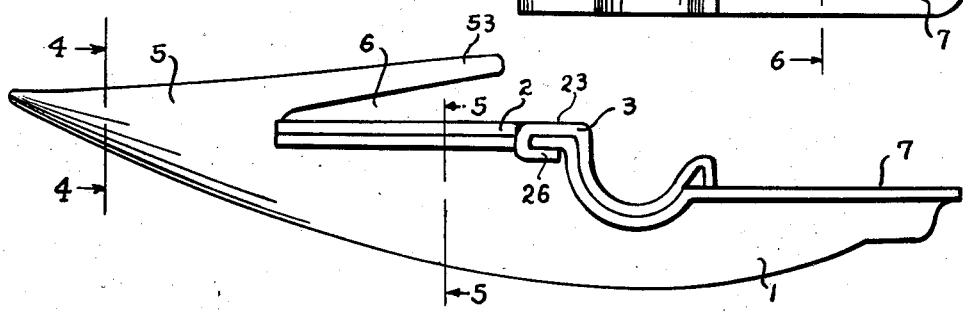
INVENTOR.
Henry. C. Ronfeldt.

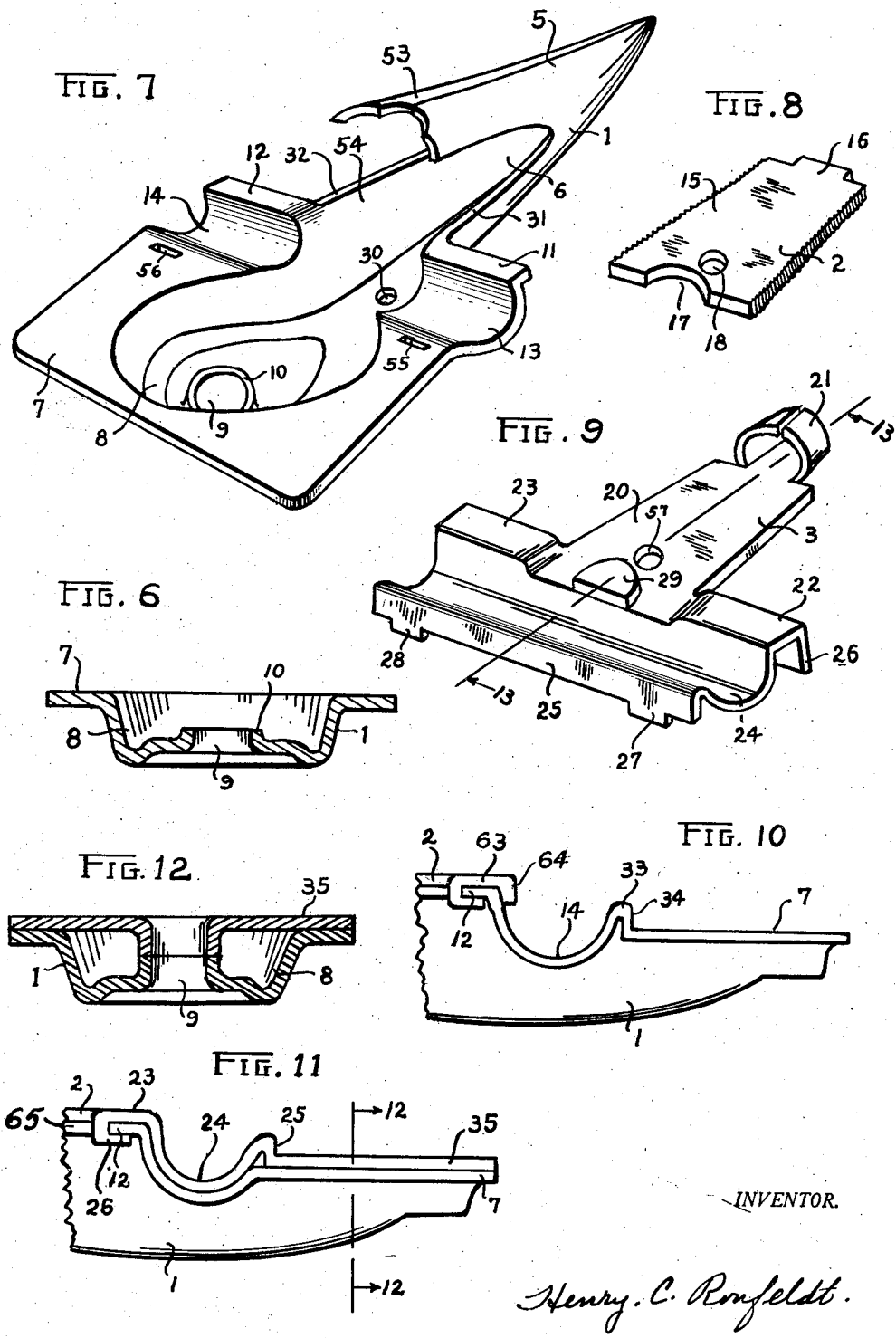

Nov. 25, 1947.  H. C. RONFELDT  2,431,509
MOWER GUARD
Filed July 22, 1944  3 Sheets-Sheet 3
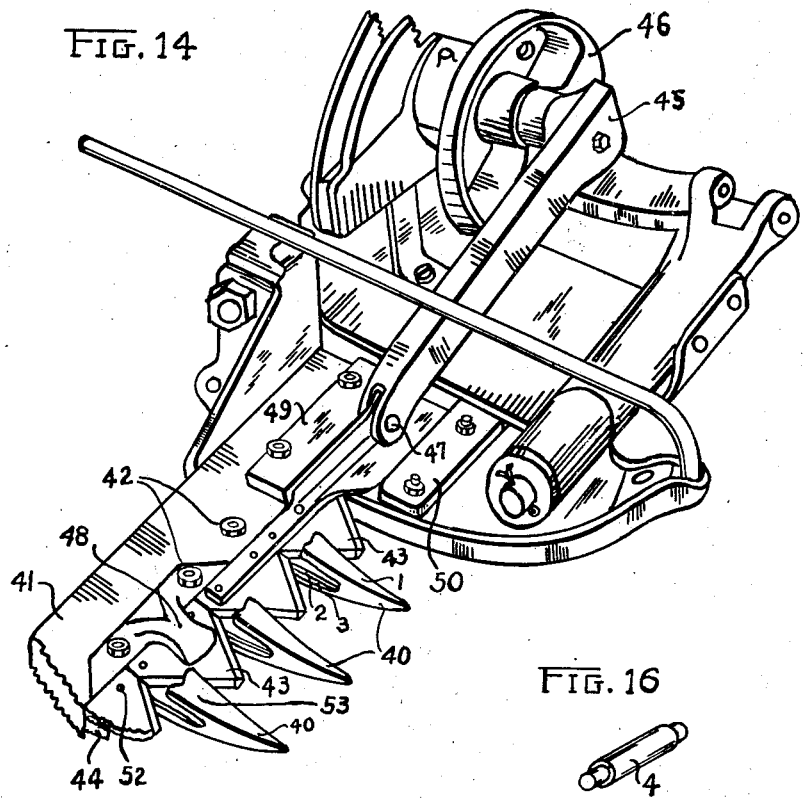
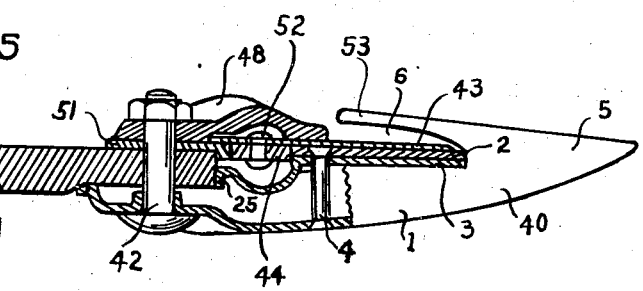
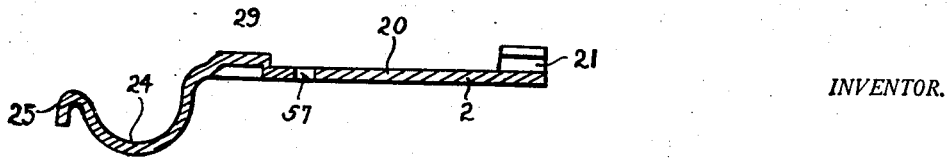
INVENTOR.
Henry. C. Ronfeldt.

UNITED STATES PATENT OFFICE 2,431,509

MOWER GUARD

Henry C. Ronfeldt, Toledo, Ohio, assignor to Toledo Stamping and Manufacturing Company, Toledo, Ohio, a corporation of Ohio Application July 22, 1944, Serial No. 546,174

9 Claims. (Cl. 56—311)

This invention relates to mower guards of the type used on horsedrawn or power mowers and more particularly to mower guards made of sheet metal.

Heretofore mower guards have been made from forgings and castings. These forgings and castings are solid members and are quite heavy. Excess weight is very objectionable especially with longer cutter bars coming into common use at the present time. Attempts have been made to reduce the weight of the cast and forged mower guards. This has been accomplished by reducing the sectional area of the mower guard. These mower guards have been proven unsatisfactory because they are not strong enough.

Mower guards are often subjected to impact and bending stresses. Cast and forged metals have low resistance to impact and bending stresses due to the characteristics of forged and cast metals. In order to obtain the strength required sufficient metal has been used in cast and forged mower guards to produce a cross section that holds up fairly well. This has resulted in a heavy mower guard. Since a large number of mower guards are used on one cutter bar the weight is a very important factor.

My improved type of mower guards overcomes this objection in two ways. My improved mower guard is made from sheet metal which is stronger and more resilient than cast or forged metal. My improved mower guard comprises a hollow section type structure which gives the greatest possible strength for the weight of metal used.

My improved type of mower guard is made of sheet metal formed in stamping presses. This eliminates some of the expensive machining processes necessary on cast and forged mower guards.

One of the objects of my invention is to provide a mower guard with the greatest possible strength for the material used.

Another object of my invention is to provide a mower guard with a hollow structure.

Another object of my invention is to provide a mower guard that eliminates expensive machining processes.

Another object of my invention is to provide a mower guard that is adapted for quantity production.

Another object of my invention is to provide an improved type of mower guard that is simple, strong, durable and inexpensive.

With these and other objects in view, my invention consists in the construction, combination and arrangements of the various parts of my improved device as described in the specification, claimed in the claims, and illustrated in the accompanying drawings in which:

Figure 1 is a perspective view of one form of my improved type mower guard.

Figure 2 is a top plan view of my improved mower guard shown in Figure 1.

Figure 3 is a side elevation of my improved type mower guard shown.

Figure 4 is a sectional view taken along line 4—4 of Figure 3.

Figure 5 is a sectional view taken along line 5—5 of Figure 3.

Figure 6 is a sectional view taken along line 6—6 of Figure 2.

Figure 7 is a perspective view of the stamped mower guard body of my improved type mower guard.

Figure 8 is a perspective view of the ledger plate used in my improved type mower guard.

Figure 9 is a perspective view of the ledger plate support and retainer.

Figure 10 is a fragmentary side elevation similar to Figure 3 showing another form of my improved type mower guard.

Figure 11 is another fragmentary side elevation showing another form of my improved type mower guard.

Figure 12 is a sectional view taken along line 12—12 of Figure 11.

Figure 13 is a cross sectional view taken along line 13—13 of Figure 9.

Figure 14 is a fragmentary perspective view of a tractor mower showing the mower guards as they are arranged on a cutter bar and a portion of the mechanism operating the mower knives.

Figure 15 is a view partially in section showing how the mower guard assembly and knife guards are fastened to the cutter bar. It also shows the arrangement of the knife and knife plate in the cutter bar and guards.

Figure 16 is a perspective view of the rivet used to hold together the parts of my improved type of mower guard.

Referring to the drawings I have shown in Figure 1 one form of my invention. My improved mower guard assembly 40 comprises a mower guard body 1 shown in Figure 7, a ledger plate 2, a stamped ledger plate support and retainer 3 and a rivet 4 for securing together the parts of my improved type mower guard.

In order to better describe the mower guard assembly and its use I have shown in Figure 14 a portion of a mower showing the mower guard assemblies 40 arranged on a cutter bar. The mower guard assemblies 40 are fastened to the cutter bar 41 by means of bolts 42. The knives 43 are riveted to a knife bar 44 which is pivotally connected to a pitman 45. The pitman is connected to an off center pin on the flywheel 46. When the flywheel 46 rotates one end of the pitman 45 rotates with the flywheel thereby causing an oscillating motion of the end of the pitman that is pivotally connected to the knife plate 44 at point 47. The knives 43 are held down on the ledger plates 2 by means of number of knife holders 48, only one of these which is shown. One end of the knife plate is guided by the plate guides 49 and 50. A lip portion 53 extends over the ledger plate 2.

Figure 15 shows how the mower guard 40 is secured to the cutter bar 41 by means of a bolt 42. The bolt 42 also fastens the knife holders 48 to the cutter bar 41.

The knife bar 44 abuts against a wear plate 51 and the mower guard stop 25 abuts the cutter bar 41. The mower guard stop 25 is of considerable length and provides a bearing to prevent the mower guard assembly from rocking due to the oscillatory motion of the knives 43.

The mower guards used at the present time are forged or cast and are secured to the cutter bar substantially in the same manner, as my improved mower guard assembly is secured to the cutter bar as disclosed in Figures 14 and 15.

My improved mower guard assembly 40 as shown in Figure 1 is fabricated from a plurality of stampings which permits the use of hollow dished and channel shaped portions and the use of sheet metal whereby stronger and more resilient mower guards are provided with less weight than the present type of cast and forged mower guards.

In my improved mower guard assembly the stamped mower guard body 1 is pressed or stamped from sheet metal blank of the proper configuration. A guard point of hollow cone shaped section 5 is formed at the front end of the blank. A substantially flat surface 7 is provided at the rear end of my improved mower guard which bolts against the under side of the cutter bar 41. A dished portion 8 is provided in the rear end of my improved mower guard, and is partially surrounded by the flat surface 7. This dished portion provides strength to the mower guard body member. A substantially channel shaped section 54 is located intermediate the hollow cone shaped section 5 and the dished portion 8 partially surrounded by the flat surface portion 7.

An aperture or bolt hole 9 is provided in the dished portion 8 and is adapted to receive a bolt 42 for securing the mower guard 40 to the cutter bar plate 41. An annular flange 10 is struck upwardly to provide a longer bearing surface for the securing bolt 42. Wings 11 and 12 are provided as a means for securing the ledger plate guide and retainer to the mower guard body 1. Concave portions 13 and 14 are provided intermediate the flat surface 7 and wings 11 and 12. A lip 53 extends rearwardly from the hollow cone shaped section over the channel shaped portion 54 of the mower guard body 1. A slot 6 is provided between the lip member 53 and the channel shaped portion 54. A ledger plate 2, ledger plate support and retainer member 3 are placed in this slot as shown in Figure 15. The knives 43 to oscillate in the slot 6.

The ledger plate 2 used in my improved mower guard is substantially a conventional ledger plate with a flat body portion 15 provided with a tongue 16 at one end and an indentation or notch 17 at the opposite end. An aperture 18 provides a hole for the insertion of the rivet 4.

The ledger plate support and retainer 3 comprises a flat body portion 20 one end of which is integral with a pair of ear shaped so as to form substantially a frustrum of a cone or a locating frustrum 21. A pair of channel members 22 and 23 extend transversely from the body portion 20. The channel portions 22 and 23 and the flat body portion 20 continue in the form of concave groove 24 which terminates in a flat portion 25 substantially at right angles to the body portion 20. The flat surface or mower guard stop 25 provides a surface which abuts the cutter bar plate when the mower guard is fastened to the cutter bar plate. The groove 24 provides clearance for the knife bar 44 and the rivets 52 as shown in Figure 15. Figure 13 is a sectional view taken along line 13—13 of the ledger plate guide and retainer shown in Figure 9. The lug 29 is pressed from the blank to form a guide lug for the ledger plate 2.

When the ledger plate support is assembled to the mower guard body the locating frustrum 21 is inserted in the guard point 5. The locating frustrum 21 telescopes in and fits snugly in the guard point 5 thus acting as a securing means as well as a locating means.

The channel portions 22 and 23 fit over the wings 11 and 12. The lower edge 26 of the channel portions is folded around the wings 11 and 12 as shown in Figures 1 and 3 thus rigidly securing the ledger plate retainer and support 3 to the mower guard body 1. The mower guard stop 25 is provided with ears 27 and 28 which fit in the slots 55 and 56. The ears 27 and 28 may be riveted, welded or merely insected in the slots 55 and 56. The concave groove portion 24 has the same configuration as the concave portions 13 and 14 of the mower guard body and nests therein when assembled as shown in Figures 1 and 3. The body 20 of the ledger plate retainer and support rests on the edges 31 and 32 of the mower guard body.

The tongue 16 of the ledger plate 2 fits securely in the locating frustrum 21 while the identation 17 fits around the guide lug 29. The channel portions 22 and 23 also provide a guide and locking means for the ledger plate 2. The rivet 4 extends through the apertures 18, 57, and 30 and is riveted in position. Thus the members of the mower guard are securely held together.

My improved mower guard formed and assembled as described is strong, durable, light in weight and resilient. The stampings shown and described are adapted to quantity production. After the proper dies have been made an unlimited quantity of uniformly shaped parts can be produced. A great saving in material, labor and machining equipment will be obtained through the production of my improved type of stamped metal mower guard.

My improved mower guard will also provide a saving of time and material during the harvesting season. Tests have proven that my improved type mower guard, assembly will withstand more bending, shock and other abuses encountered in normal use than will cast or forged mower guards. This much valuable time may be saved at critical periods by avoiding fractures and broken mower guards with the use of my improved stamped mower guard.

It is apparent that many modifications may be made from the forms of my invention described above.

Figure 10 discloses another form of my invention. In this form of my invention a portion 64 of the ledger plate retainer and support 63 extends over the back edge of the guard wings 11 and 12 and terminates at that point instead of extending over the grooves 13 and 14 onto the flat surface 7. In order to provide a mower guard stop a fold 33 is made adjacent the flat surface 7. A flat side 34 of the fold then acts as a mower guard stop.

Figure 11 discloses another form of my novel mower guard. In this construction the ledger plate retainer and support 65 is provided with a flat portion 35 extending at right angles from the mower guard stop surface 25. The flat surface thus provided by the two layers 7 and 35 provides a considerable increase strength.

While I have described several embodiments of my invention, I do not wish to be limited to the particular form shown and described as it will be apparent that many modifications therein may be made without departing from the scope of my invention as set forth in the appended claims. Having thus described my invention what I claim is:

1. A mower guard assembly comprising a stamped metal mower guard body member provided with a substantially hollow cone shaped front portion, a substantially channel shaped mid portion and a dished rear portion, a ledger plate member provided with a tongue portion, and a stamped metal ledge plate support and retainer member comprising a flat body portion adapted to seat on the edges of said channel shaped portion and thereby substantially close the channel shaped portion and a means at the front end of said ledger plate support and retainer member adapted to engage said tongue portion of said ledger plate and also to locate the front end of said ledger plate support member in said hollow cone shaped portion.

2. A mower guard assembly comprising a stamped metal mower guard body member, said body member comprising a hollow pointed front portion a substantially channel shaped mid portion a plurality of wing members extending laterally from said channel shaped portion and a rear portion adapted to be secured to a cutter bar and a ledger plate support and retainer member provided with a flat body portion substantially closing said channel portion, laterally extending wing portions engaging said wing members of said body member and a means at the front end of said ledger plate support member adapted to engage the hollow pointed portion of said body member.

3. A mower guard assembly comprising a stamped metal mower guard body member, said body member comprising a hollow conical forwardly extending portion, a substantially channel shaped portion extending rearwardly from said channel shaped portion and terminating in a dished body portion, an annular upwardly extending flange located in said dished portion, a plurality of wing portions extending laterally from said channel shaped portion; a ledger plate support and retainer comprising a flat body portion adapted to seat on the upper edges of said channel shaped portion, a plurality of ears at one end of said ledger plate support and retainer adapted to telescope in said conical portion whereby one end of said ledger plate support is located and retained in a predetermined position, a locating boss near the opposite end of said flat body portion, a plurality of portions extending laterally from said flat body portion and partially enveloping said wing portions; a ledger plate provided with a tongue adapted to engage said plurality of ears of said ledger plate support and retainer whereby one end of said ledger plate is located in a predetermined position, and a means for retaining said mower guard body member, said ledger plate support and retainer, and said ledger plate in assembled position.

4. A mower guard assembly comprising a mower guard body member comprising a hollow substantially cone shaped portion, a dished portion partially surrounded with a flat edge, a substantially channel shaped portion intermediate said hollow cone shaped portion and said dished portion; a ledger plate support and retainer comprising a flat body portion adapted to seat on the upper edges of said channel shaped portion, a plurality of ears at one end of said ledger plate support and retainer adapted to telescope in said hollow conical portion, a locating boss near the other end of said flat body portion, a plurality of portions extending laterally from said flat body portion; a ledger plate provided with a tongue adapted to engage said plurality of ears whereby one end of said ledger plate is located and retained in a predetermined position, said locating boss engaging said ledger plate, whereby the other end of said ledger plate is located in a predetermined position; and a means for retaining said mower guard body member, said ledger plate support and retainer, and said ledger plate in assembled positions.

5. In combination with a stamped metal mower guard body, provided with a hollow portion a ledger plate, a ledger plate support and retainer member provided with a plurality of ears adapted to locate one end of said ledger plate support and retainer member in a predetermined position in said hollow portion, said plurality of ears also adapted to locate said ledger plate in a predetermined position with respect to said ledger plate support and retainer.

6. In combination with a stamped metal mower guard body, provided with a hollow portion a ledger plate, a ledger plate support and retainer member provided with a plurality of ears adapted to locate one end of said ledger plate support and retainer member in a predetermined position in said hollow portion, said plurality of ears also adapted to locate said ledger plate in a predetermined position with respect to said ledger plate support and retainer, and a plurality of means adapted to retain said stamped mower guard body, said ledger plate and said ledger plate support and retainer in assemblage.

7. A mower guard assembly comprising a stamped metal mower guard body member, said body member comprising a hollow substantially cone shaped forwardly extending portion, a dished portion partially surrounded with a flat surface portion, a substantially channel shaped portion intermediate said hollow cone shaped portion and said dished portion, and a plurality of wing portions extending laterally from said channel shaped portion, a ledger plate support and retainer comprising a flat body portion adapted to seat on the upper edges of said channel shaped portion, a plurality of ears at one end of said ledger plate support and retainer adapted to seat in said hollow conical shaped portion, a locating boss near the other end of said flat body portion, a plurality of wing portions extending laterally from said flat body portions and partially folded around said wing portions of said body member, a web portion extending rearwardly from said wing portions and said flat body portion over said dished portion and said flat surface portion of said mower guard body member; a ledger plate member provided with a tongue adapted to engage said plurality of ears whereby one end of said ledger plate is located and retained in a predetermined position, said locating boss adapted to engage said ledger plate whereby the other end of said ledger plate is located in a predetermined position; and a means for retaining said mower guard body member, said ledger plate and said ledger plate support and retainer in assembled position.

8. A mower guard assembly comprising a stamped metal mower guard body member, said body member comprising a hollow substantially cone shaped forwardly extending portion, a dished portion partially surrounded with a flat surface portion, a substantially channel shaped portion intermediate said hollow cone shaped portion and said dished portion, and a plurality of wing portions extending laterally from said channel shaped portion; a ledger plate support and retainer comprising a flat body portion adapted to seat on the upper edges of said channel shaped portion, a plurality of ears at one end of said ledger plate support and retainer adapted to seat in said hollow conical shaped portion, a locating boss near the other end of said flat body portion, a plurality of wing portions extending laterally from said flat body portions and partially folded around said wing portions of said body member, a web portion extending rearwardly from said wing portions and said flat body portions over said dished portion and said flat surface portion of said mower guard body member, and a plurality of lateral embossings in said web providing a cutter bar stop; a ledger plate member provided with a tongue adapted to engage said plurality of ears whereby one end of said ledger plate is located and retained in a predetermined position, said locating boss adapted to engage said ledger plate whereby the other end of said ledger plate is located in a predetermined position; and a means for retaining said mower guard body member, said ledger plate and said ledger plate support and retainer in assembled position.

9. A mower guard assembly comprising a mower guard body member provided with a hollow substantially cone shaped forwardly extending portion with a curved lip portion extending rearwardly therefrom, a dished portion near the rear end of said body member, a flat surface portion partially surrounding said dished portion, a substantially channel shaped portion intermediate said dished portion and said hollow cone shaped portion, a plurality of wing portions extending laterally from said channel shaped portion, and a plurality of grooved portions intermediate said flat surface portion and said wing portions; a ledger plate provided with a tongue at one end thereof and a locating means at the other end thereof; a ledger plate support and retainer comprising a flat body portion provided with a plurality of ears at one end thereof so shaped as to locate said ledger plate support and retainer in a predetermined position in said cone shaped portion of said body member, said plurality of ears also adapted to receive said tongue whereby one end of said ledger plate is located in a predetermined position, a locating boss in said flat body portion of said ledger plate and support adapted to engage said locating means in said ledger plate whereby the other end of said ledger plate is located in a predetermined position, a plurality of wings extending laterally from said flat body portion of said ledger plate support and retainer and secured to said wing members extending from said channel shaped portion, a plurality of laterally grooved portions extending rearwardly from said winged portions.

HENRY C. RONFELDT.

REFERENCES CITED

The following references are of record in the file of this patent:

UNITED STATES PATENTS

| Number | Name | Date |
|---|---|---|
| 1,540,157 | Bagan | June 2, 1925 |
| 1,601,826 | Griffin | Oct. 5, 1926 |
| 1,789,781 | Seidel | Jan. 20, 1931 |
| 2,278,393 | Vutz | Mar. 31, 1942 |

FOREIGN PATENTS

| Number | Country | Date |
|---|---|---|
| 2,251 | Great Britain | 1906 |
| 275,263 | Germany | June 12, 1914 |
| 255,220 | Italy | Oct. 12, 1927 |